United States Patent Office 3,425,705
Patented Feb. 4, 1969

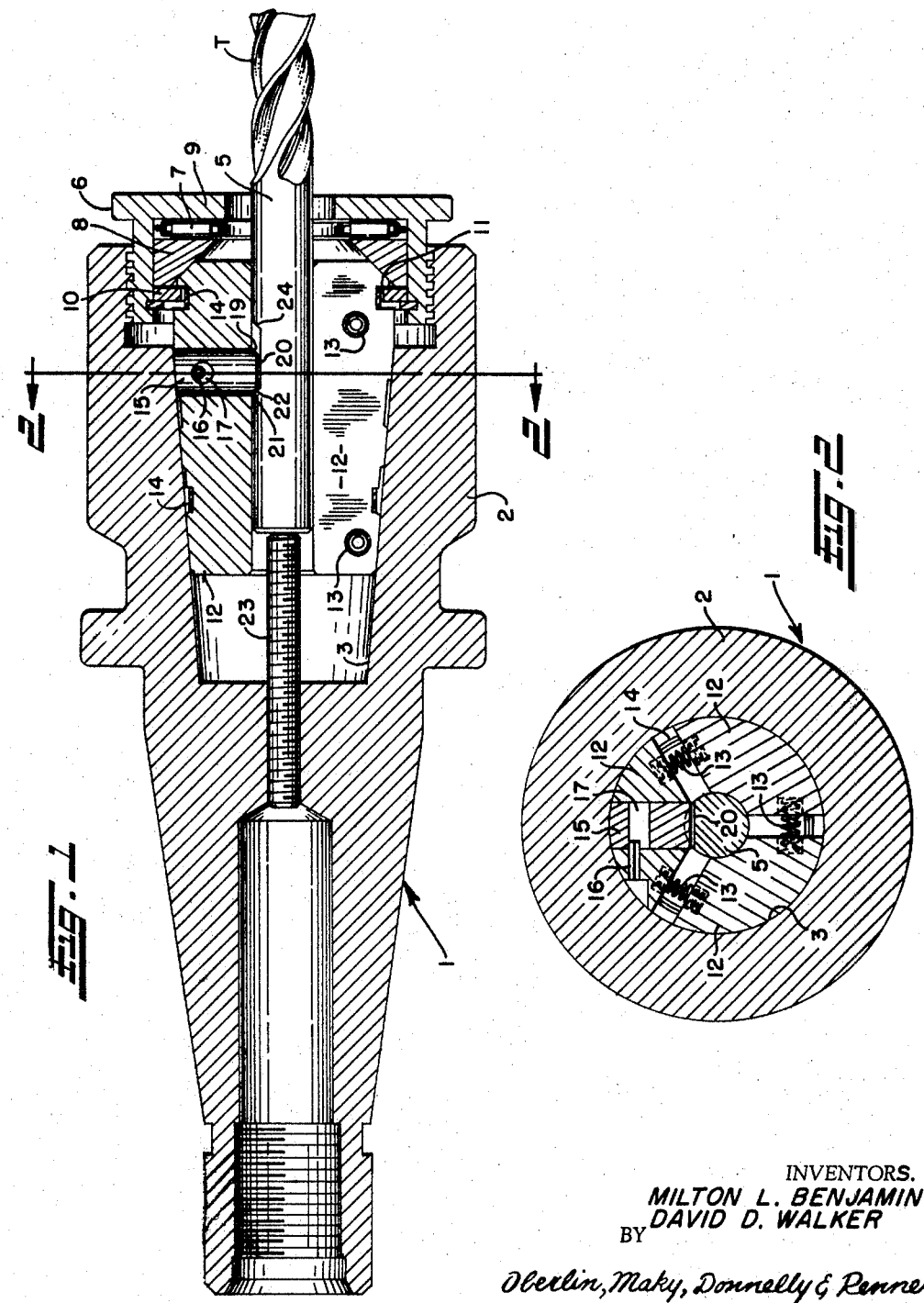

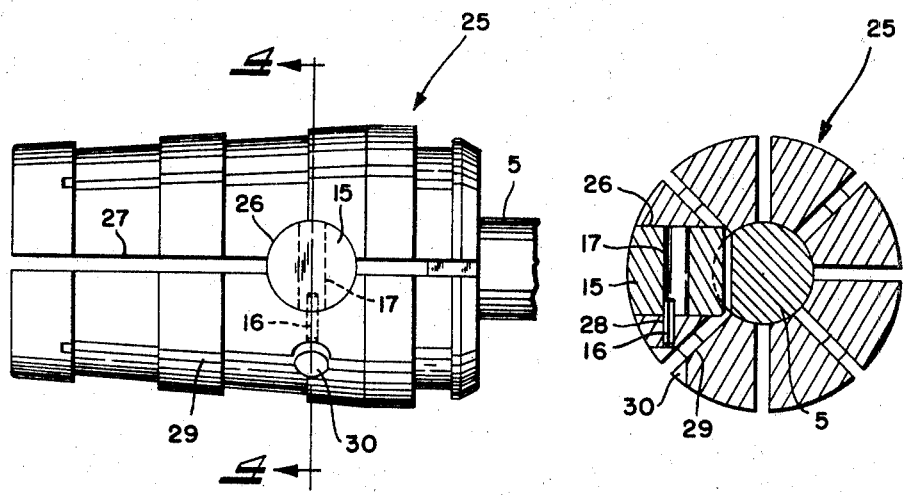

3,425,705
COLLET CHUCK AND THE LIKE
Milton L. Benjamin and David D. Walker, Chagrin Falls, Ohio, assignors to Erickson Tool Company, Solon, Ohio, a corporation of Ohio
Continuation-in-part of application Ser. No. 552,956, May 25, 1966. This application Mar. 22, 1967, Ser. No. 633,337
U.S. Cl. 279—56         9 Claims
Int. Cl. B23b 31/12

ABSTRACT OF THE DISCLOSURE

A collet chuck having a radially inwardly movable pin therein for locking a tool against axial withdrawal from and turning in the collet.

Cross-reference to related application

This application is a continuation-in-part of copending application Ser. No. 552,956, filed may 25, 1966, now abandoned, with Milton L. Benjamin and David D. Walker as the inventors.

Background of the invention

The present invention relates generally as indicated to a collet chuck and more particularly to a collet chuck having means for locking an end mill or like tool against turning and axial withdrawal with respect to the collet. An end mill, for example, generally has helical flutes thereon which tend to "hog" into a workpiece at a rate exceeding the feed of the spindle on which the chuck is mounted, and thus severe tensile stresses are imposed on the tool causing it to be axially pulled out of and turned in the collet.

Summary of the invention

The chuck disclosed herein includes a collet having tool locking means that cooperates with a shoulder and adjacent flat on the tool shank to prevent axial withdrawing movement and turning of the tool in the collet, which is a primary object of this invention.

It is another object of this invention to provide a novel collet chuck having a radially movable locking pin therein which, in its tool locking position, has its inner end radially overlapped with the shoulder of the tool shank and in juxtaposition with the adjacent flat of the tool shank thus to prevent axial withdrawal and turning of the tool.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but several of the various ways in which the principles of the invention may be employed.

Brief description of the drawing

In such annexed drawing:

FIG. 1 is a central longitudinal cross-section view of one form of collet chuck embodying the present invention;

FIG. 2 is a transverse cross-section view taken substantially along the line 2—2 of FIG. 1;

FIG. 3 is a somewhat enlarged top plan view of another form of collet which may be used with the chuck of FIG. 1; and FIG. 4 is a transverse cross-section view through the collet of FIG. 3 taken on the plane of the line 4—4 thereof.

Description of the preferred embodiments

The chuck 1 illustrated in FIGS. 1 and 2 comprise a chuck body 2 having a tapered bore 3 with which the collet 4 cooperates for contraction into gripping engagement with the shank 5 of a tool T such as an end mill through axial force applied on the outer end of the collet 4 by means of a nosepiece assembly including a nosepiece 6 having threaded engagement with the chuck body 2 and a thrust bearing 7 interposed between the nose ring 8 and the nosepiece flange 9. Thus, when the nosepiece 6 is tightened, the nose ring 8 bears on the outer end of the collet 4 and urges it axially inwardly against the tapered bore 3 to thus effect contraction of the collet 4 into firm gripping engagement with the tool shank 5. Because it is preferred to have self-locking wedge-taper engagement between the collet 4 and chuck body 2, there is provided in the nosepiece assembly a collet withdrawing ring 10 which bears against the shoulder 11 of the collet 4 to positively withdraw the collet 4 from the chuck body 2 upon loosening of the nosepiece 6.

The collet 4 herein shown in FIGS. 1 and 2 by way of example comprises three segments 12 with coil springs 13 therebetween and with retainer rings 14 adjacent the ends of the segments 12.

One of the segments 12 has a radial opening in which the cylindrical locking pin 15 is slidably disposed, said locking pin 15 being retained by a retainer pin 16 in said segment 12 which extends into an opening 17 diametrically through the locking pin 15. The opening 17 is larger in diameter than the retainer pin 16 to permit radial movement of the locking pin 15 when the tool shank 5 is inserted into or withdrawn from the collet 4. To remove the locking pin 15 from the segment 12, the pin 16 is driven into the opening 17, the length of pin 16 being less than the diameter of the locking pin 15.

Alteratively, a one-piece collet 25 of the type illustrated in FIGS. 3 and 4 which is axially slotted from opposite ends in conventional manner may be used instead of the segmented collet 4. As shown, such collet 25 may have a radial opening 26 extending through one of the axial slots 27 for slidably receiving the locking pin 15 therein. The locking pin 15 is retained in the opening 26 by the retainer pin 16 as before, it being press fitted in a transverse bore 28 in the collet 25 and projecting into the larger diameter opening 17 to permit the required limited radial movement of such locking pin. The bore 28 communicates with the next axial slot 29 adjacent the outer surface of the collet 25 where it is milled out at 30 to facilitate insertion of the retainer pin 16 into the bore. The locking pin 15 is removed from the chuck 25 in the same way that it is removed from the chuck 4, previously described; i.e. by driving the locking pin 16 completely into the opening 17.

In any event, whether a segmented collet 4 or slotted collet 25 is used, the operation is the same. As the tool shank 5 is inserted into the collet 4 or 25, the end of the tool shank 5 engages the beveled surface 19 of the locking pin 15 to move the latter radially outwardly. When the flat 20 of the tool shank 5 is axially regeistered and parallel to the inner end of the locking pin 15, the latter may be pushed in so that its outer end is substantially flush with the exterior tapered surface of the collet. The nosepiece and collet assembly are then inserted and secured in the chuck body 2 and when the nosepiece 6 has been tightened by hand, the tool shank 5 may be pulled axially outwardly so that the shoulder 21 adjacent the flat 20 engages the other beveled surface 22 at the inner end of the locking pin 15. Such pulling of the tool shank 5 may also slightly turn the locking pin 15 so that the shoulder 21 and beveled surface 22 are aligned with each other.

Positioning of the shoulder 21 with reference to the beveled face 22 may be automatically accomplished by presetting or manipulation of the stop screw 23 which has threaded engagement in the chuck body 2. When the nosepiece 6 is fully tightened, the chuck 4 or 25 is radially contracted in tight gripping engagement with the tool shank 5 and preferably the inner end of the locking pin 15 will have a slight clearance with the flat 20 on the tool shank 5 so that the tool T will not be forced off-center.

As evident, the stop screw 23 may be dispensed with by having the beveled surfaces 19 and 22 of the locking pin 15 spaced apart substantially the same distance as the shoulders 21 and 24 at the ends of the flat 20 thus to lock the tool T against axial withdrawal and axial inward movement. For economy of manufacture the locking pin 15 is of circular cross-section slidably fitting in a round hole in the chuck 4 or 25. However, the locking pin 15 may be non-circular cross-section to fit a complemental hole in the chuck to keep the locking pin 15 from turning, whereby the beveled surface 22 will always be aligned with the shoulder 21 of the tool shank 5.

As evident, when the nosepiece 6 has been tightened as aforesaid, the tool T cannot be axially withdrawn from the collet 4 or 25 by reason of the engagement of the shoulder 21 with the correspondingly beveled surface 22 of the locking pin 15, the locking pin 15 being prevented from moving radially outwardly by the surrounding tapered bore 3 of the chuck body 2. Likewise, the tool T cannot turn in the collet 4 or 25 by reason of the location of the locking pin 15 in juxtaposition to the flat 20 on the tool shank 5.

We therefore particularly point out and distinctly claim as our invention:

1. A chuck comprising a body having a bore; a collet arranged to be radially contracted when axially moved in the bore in said body; a nosepiece on said body for so axially moving said collet; a radially disposed locking pin in said collet having an inner end adapted to radially overlap a shoulder on the shank of a tool to prevent axial withdrawal of the tool from said collet and having an outer end which is substantially flush with the exterior surface of said collet and in close proximity to the wall of the bore in said body; and said collet having retainer means to permit limited radial movement of said locking pin for axial insertion of the tool shank shoulder therepast prior to insertion of said collet into the bore of said body, said retainer means comprising a transverse retainer pin in said collet having one end extending into an opening in said locking pin which has a radial dimension larger than that of said retainer pin to permit such limited radial movement of said locking pin.

2. The chuck of claim 1 wherein said retainer pin is of such length that it may be completely driven longitudinally into the opening in said locking pin for removal of said retainer pin and locking pin from said collet.

3. The chuck of claim 1 wherein said collet comprises a plurality of segments arranged to be radially contracted when axially moved into the bore of said body, one of said segments having a first radial opening in which said locking pin is slidably disposed and a second transverse opening communicating with said first opening for receipt of said retainer pin.

4. The chuck of claim 1 wherein said collet is axially slotted from opposite ends to permit radial contraction of said collet when axially moved into the bore of said body, said collet having a first radial opening extending through one of said axial slots for slidably receiving said locking pin.

5. The chuck of claim 4 wherein there is a second transverse opening in said collet communicating with said first opening in which said retainer pin is press fitted, said second opening also communicating with an adjacent axial slot at the outer surface of said collet to facilitate insertion of said retaining pin in said second opening.

6. A chuck comprising a body having a bore; a collet comprising a plurality of segments arranged to be radially contracted when axially moved in the bore in said body; a nosepiece on said body for so axially moving said collet; a radially disposed cylindrical locking pin in one of said segments having an inner beveled end adapted to radially overlap a shoulder on the shank of a tool to prevent axial withdrawal of the tool from said collet and having an outer end which is substantially flush with the exterior surface of said one segment and in close proximity to the wall of the bore in said body; said one segment having retainer means to permit limited radial and turning movement of said locking pin for axial insertion of the tool shank shoulder past said beveled end prior to insertion of said collet into the bore of said body and for alignment of said beveled end with such shoulder upon application of axial withdrawing force on the tool shank before final radial contraction of said collet, said retainer means comprising a transverse retainer pin in said one segment having one end extending into an opening in said locking pin which is of larger diameter than said retainer pin to permit such limited radial and turning movement of said locking pin.

7. The chuck of claim 6 wherein said retainer pin is of length such that it may be completely driven longitudinally into the opening in said locking pin to permit removal of the latter from said one segment.

8. A chuck comprising a body having a bore; a collet arranged to be radially contracted when axially moved in the bore in said body; a nosepiece on said body for so axially moving said collet; a radially disposed locking pin in said collet having an inner end adapted to radially overlap a shoulder on the shank of a tool to prevent axial withdrawal of the tool from said collet and having an outer end which is substantially flush with the exterior surface of said collet and in close proximity to the wall of the bore in said body; and a retainer pin received in aligned openings in said collet and locking pin for retaining said locking pin in said collet.

9. The chuck of claim 8 wherein one of said openings in said collet and locking pin is larger than said retainer pin to permit limited radial movement of said locking pin for axial insertion of the tool shank shoulder therepast prior to insertion of said collet into the bore of said body.

References Cited
UNITED STATES PATENTS 3,195,909   7/1965   Winnen _____ 279—51

ROBERT C. RIORDON, *Primary Examiner.*

D. R. MELTON, *Assistant Examiner.*